US008255316B2

(12) United States Patent
Bal et al.

(10) Patent No.: US 8,255,316 B2
(45) Date of Patent: Aug. 28, 2012

(54) INTEGRATED BUSINESS DECISION-MAKING SYSTEM AND METHOD

(75) Inventors: Debasis Bal, Bangalore (IN); Jayanth Kalle Marasanapalle, Bangalore (IN)

(73) Assignee: General Electric Company, Niskayuna, NY (US)

( * ) Notice: Subject to any disclaimer, the term of this patent is extended or adjusted under 35 U.S.C. 154(b) by 928 days.

(21) Appl. No.: 11/962,240

(22) Filed: Dec. 21, 2007

(65) Prior Publication Data

US 2009/0164297 A1  Jun. 25, 2009

(51) Int. Cl.
*G06Q 40/00* (2012.01)

(52) U.S. Cl. .......................................... 705/37; 705/38

(58) Field of Classification Search .................. 705/36, 705/37, 7, 38
See application file for complete search history.

(56) References Cited

U.S. PATENT DOCUMENTS

| 6,088,686 | A | 7/2000 | Walker et al. |
| 6,272,472 | B1 | 8/2001 | Danneels et al. |
| 6,556,974 | B1 * | 4/2003 | D'Alessandro ............ 705/7.32 |
| 7,328,182 | B1 * | 2/2008 | Yahil et al. ................. 705/36 R |
| 7,580,848 | B2 * | 8/2009 | Eder .............................. 705/7.11 |
| 2002/0174081 | A1 * | 11/2002 | Charbonneau et al. ......... 706/15 |
| 2004/0044615 | A1 * | 3/2004 | Xue et al. ......................... 705/38 |
| 2004/0083152 | A1 * | 4/2004 | Markov et al. .................. 705/36 |
| 2004/0103058 | A1 | 5/2004 | Hamilton |
| 2004/0172409 | A1 * | 9/2004 | James ........................ 707/104.1 |
| 2004/0243506 | A1 | 12/2004 | Das |
| 2005/0080696 | A1 * | 4/2005 | Bagchi et al. ................... 705/35 |
| 2005/0125322 | A1 * | 6/2005 | Lacomb et al. ................. 705/35 |
| 2006/0143071 | A1 | 6/2006 | Hofmann |
| 2007/0050288 | A1 * | 3/2007 | Sarkar et al. .................... 705/38 |

* cited by examiner

*Primary Examiner* — Thomas Dixon
*Assistant Examiner* — Benjamin S Fields
(74) *Attorney, Agent, or Firm* — Scott J. Asmus

(57) ABSTRACT

An integrated business decision-making system is provided. The system comprises a data processing component, a prediction component and an optimization component. The data processing component is configured to process observational data related to one or more members of a target population. The prediction component is configured to predict a business measure based on one or more selected combinations of marketing actions and the observational data related to one or more of the members of the target population. The optimization component is configured to determine an optimal marketing action based on one or more of the selected combinations of marketing actions and the predicted business measure associated with each of the marketing actions. The optimization component is further configured to determine an optimal predicted business measure for the members of the target population, based on the optimal marketing action.

19 Claims, 3 Drawing Sheets

INTEGRATED BUSINESS DECISION-MAKING SYSTEM AND METHOD

BACKGROUND

The invention relates generally to customer relationship management (CRM) and more particularly to a system and method for developing an integrated business decision framework for improved decision making in business processes.

There are a number of distinct business processes that consumer or retail finance organizations routinely undertake. Of major importance are the risk management and the customer relationship management processes. Traditionally, banks and financial institutions have kept these business processes as separate entities. The decisions that involve both are usually taken at a higher administrative level, often in an ad-hoc fashion. Risk management is traditionally based on identifying customers that have a propensity to remain in good financial standing and not default on obligations, or in other words, that have a minimum risk of default. For example, a "risk" or "credit scoring" process may be used to score customers according to their propensity to remain in good financial standing and not default on obligations. The risk scoring process in general may also be based on several factors, such as the customer's credit risk profile, his/her income, his/her profit potential, the offered product and the credit policies of the finance organization.

On the other hand, customer relationship management (CRM) is based on identifying high-potential current or future customers who may not necessarily have a low risk of default. Of significant importance here is the computation of "response scores" for marketing campaigns, which are dedicated to identifying high-potential current or future customers, "high potential" being defined by a favorable likelihood of response of a consumer to a new offer of credit. A number of statistical analysis approaches have been used to define the characteristics that are most predictive of a consumer's future behavior. Furthermore, and as will be appreciated by those skilled in the art, the need to market aggressively to moderate risk individuals and households is business-critical in the current highly competitive consumer finance world. Marketing activities, such as, for example, customer acquisition, cross-selling, up-selling and customer retention play a significant role in attracting and retaining customers, through aggressive marketing policies. However, many of these activities are often designed separately, rely on specific business rules and are performed independently of each other. In addition, conflicting goals between risk and marketing often arise, resulting in a non-unified risk and marketing strategy.

In addition, the computation of risk scores and response scores by risk management and CRM processes are generally performed independently and also do not take into consideration pricing policies associated with financial products. In general, pricing policies for financial products may be based on several factors, such as, for example, meeting a specific target return on investment, maximizing revenue, or based on the average industry price for a particular financial product. Furthermore, the computation of risk scores and response scores by these processes is usually static in nature, and does not take into consideration key transactional portfolio trends, thereby resulting in the generation of sub-optimal business decisions.

It would be desirable to integrate the key portfolio management processes of risk, marketing and pricing policies into a single platform for improved decision making in business processes. In addition, it would be desirable to develop an integrated business decision framework that can integrate and optimize various marketing activities to meet a common business goal, that can serve to recommend business decisions, and provide an analytical framework for making collective decisions on routine processes such as pricing of a financial product and determining the creditworthiness of the members of a target population.

BRIEF DESCRIPTION

Embodiments of the present invention address these and other needs. In one embodiment, an integrated business decision-making system is provided. The system comprises a data processing component, a prediction component and an optimization component. The data processing component is configured to process observational data related to one or more members of a target population. The prediction component is configured to predict a business measure based on one or more selected combinations of marketing actions and the observational data related to one or more of the members of the target population. The optimization component is configured to determine an optimal marketing action based on one or more of the selected combinations of marketing actions and the predicted business measure associated with each of the marketing actions. The optimization component is further configured to determine an optimal predicted business measure for the members of the target population, based on the optimal marketing action.

In another embodiment, a method for developing an integrated business decision-making system is provided. The method comprises the steps of processing observational data related to one or more members of a target population and determining one or more selected combinations of marketing actions related to the members of the target population. The method further comprises the steps of predicting a business measure based on one or more of the selected combinations of marketing actions and the observational data related to the members of the target population, and determining an optimal marketing action based on one or more of the selected combinations of marketing actions and the predicted business measure associated with each of the marketing actions, for each member of the target population.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
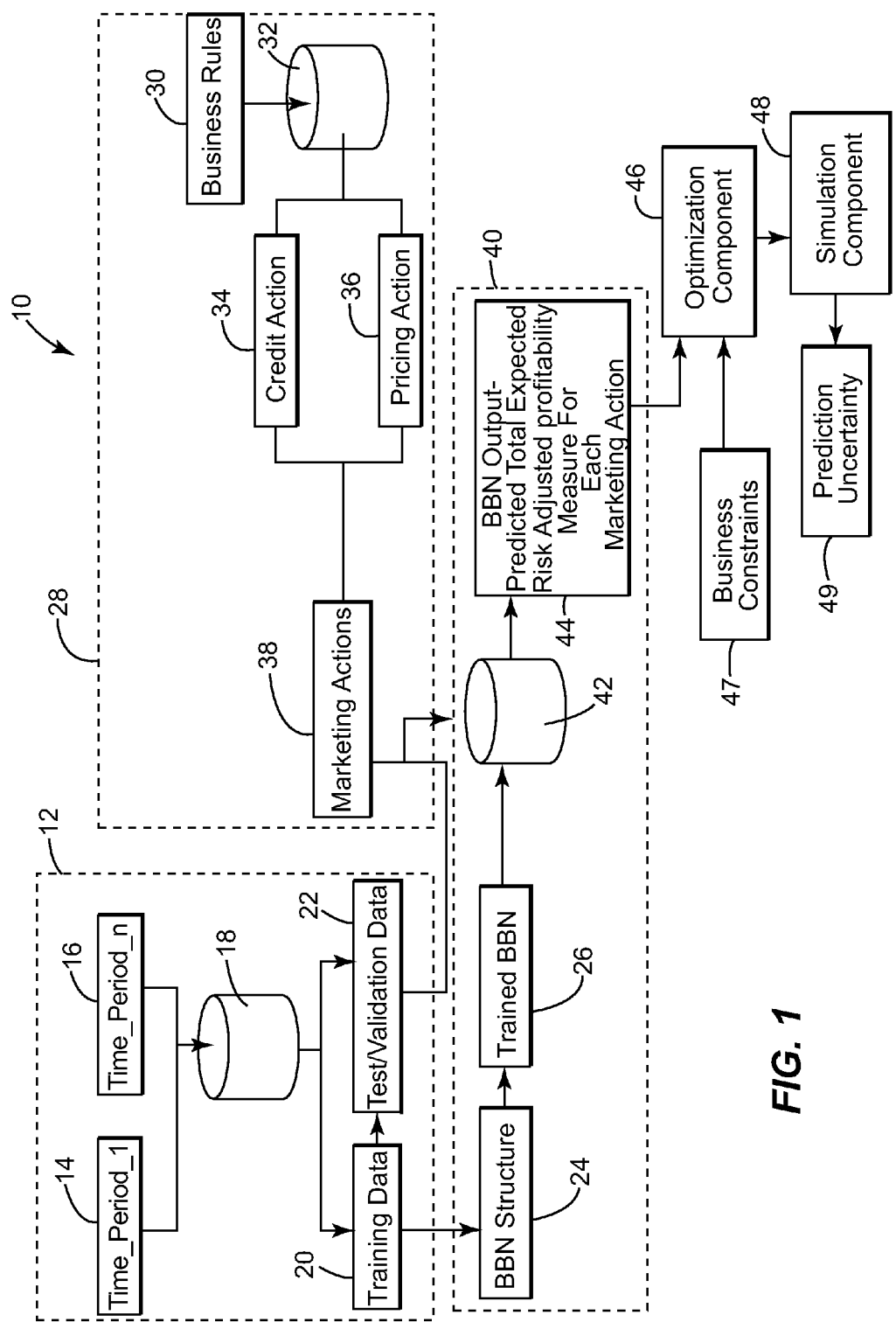
FIG. 1 is a high level diagram of an integrated business decision-making system, in accordance with one embodiment of the present invention.

FIG. 1 is a high level diagram of an integrated business decision-making system, in accordance with one embodiment of the present invention. As shown in FIG. 1, the system 10 generally includes a data processing component 12, a marketing action generation component 28, a prediction component 40, an optimization component 46 and a simulation component 48. Referring to FIG. 1, in an exemplary operation of the system 10, the data processing component 12 is configured to process observational data 14, 16 related to one or more members of a target population over a period of time. In one example, the data processing component 12 may be configured to collect the observational data 14, 16 over several time periods. For example, the observational data may represent temporal data collected and combined over a period of several months and/or years. The observational data may further include one or more data variables that describe various behavioral aspects of an individual member's account and future actions that may be controlled to influence an individual member's account behavior, in one embodiment. For example, the data variables may include account level behavioral variables such as, credit line, price, credit or risk scores, response or propensity scores, pay-off or attrition scores, account balance and utilization. In a particular embodiment, the behavioral variables may include for example, a risk score, a utilization amount, an initial credit line, an initial balance, an initial contract amount, an initial annual percentage rate and a response score associated with the members of the target population.

As is known to those skilled in the art, risk scores measure the risk factor associated with a member account based on the past behavior of the account. Risk scores may be computed based on information about a member/customer's job profile and his/her position held in the job, his/her credit history, the number of years of residence of the customer at his/her current address, his/her income statement, the bank accounts and the life insurance policies of the customer and the loan repayment history of the customer. Similarly, the utilization amount is a measure of the contract amount utilized by an individual member account; the initial credit line refers to the credit-line amount at a particular cut-off month; the initial balance refers to the account balance at the cut-off month; the initial contract amount refers to the maximum loan amount of a member account, wherein the initial contract amount may be typically less than or equal to the initial credit line for the account; the initial annual percentage rate (APR) refers to the current APR at which the interest income is being calculated for the member account; and the response score is a score that indicates the responsiveness of a member account to credit line increases.

In another example, the data variables may further include one or more control variables that comprise action variables describing various marketing actions that may be applied to influence the future behavior of a member account. The control variables may include, for example, an action credit line and/or a promotional annual percentage rate (APR) associated with each member of the target population. The action credit line refers to the credit line that is offered at the cut-off point, after which a member can increase his/her contract amount, for an increased loan amount; and the promotional APR refers to a lower APR than the member account's existing APR, which is an incentive for a member account to increase his/her utilization and/or contract amount. In general, a promotional APR may be offered to a customer who has been given a credit line in the past, but has not yet responded to it.

Referring to FIG. 1 again, a database 18 may be used to store the observational data 14, 16 collected by the data processing component 12. The data processing component 12 is further configured to generate training data 20 and test/validation data 22 from the observational data 14, 16. In one embodiment, the training data 20 and the test/validation data 22 may be generated by randomly sampling the observational data 14, 16 collected and stored over a period of time. As will be discussed in greater detail below, the training data 18 and the test/validation data 20 may be used to train and validate a prediction model, as well as to compute optimal marketing actions for each individual account. In another embodiment, the data processing component 12 may also perform a variety of data processing functions, such as, for example, data cleaning, wherein data not pertinent to the prediction of data, may be removed. This data may include, for example, member accounts that received a credit line decrease and/or new accounts as defined by the business that are ineligible for promotions.

The prediction component 40 is configured to build a prediction model based on the training data 20 and the test/validation data 22 generated by the data processing component 12. In one embodiment, the prediction model is a Bayesian belief network (BBN). Further, in one embodiment, the BBN may be implemented as a non-linear prediction model. As is known to those skilled in the art, a BBN is generally represented as a directed graph comprising a plurality of nodes and arcs. The nodes represent discrete or continuous variables and the arcs represent causal relationships between the variables. Further, each node in the BBN is generally associated with a probability table. The probability table for a node represents the probability of occurrence of all combinations of values that can be assigned to a node and its parent nodes. In other words, the BBN encodes the joint probability distribution for a set of variables in the form of conditional probability tables. In one embodiment, each probability value in the probability table is indicative of a range of possible values that can be assigned to each of the nodes in the BBN.

Referring to FIG. 1, and in one embodiment, the prediction component 40 initially populates a BBN structure 24 with the training data 20 received from the data processing component 16 to generate a trained BBN 26. As discussed above, the structure of a BBN is typically represented by one or more nodes, edges and conditional probability tables. In one embodiment, the structure of the BBN 24 may be built by selecting one or more variables in the graph based upon a combination of business knowledge and statistical tests. For example, statistical tests may include correlations and/or regression techniques to identify correlated variables as well as to prioritize variables and improve the predictive capability of the BBN.

Figure 2:
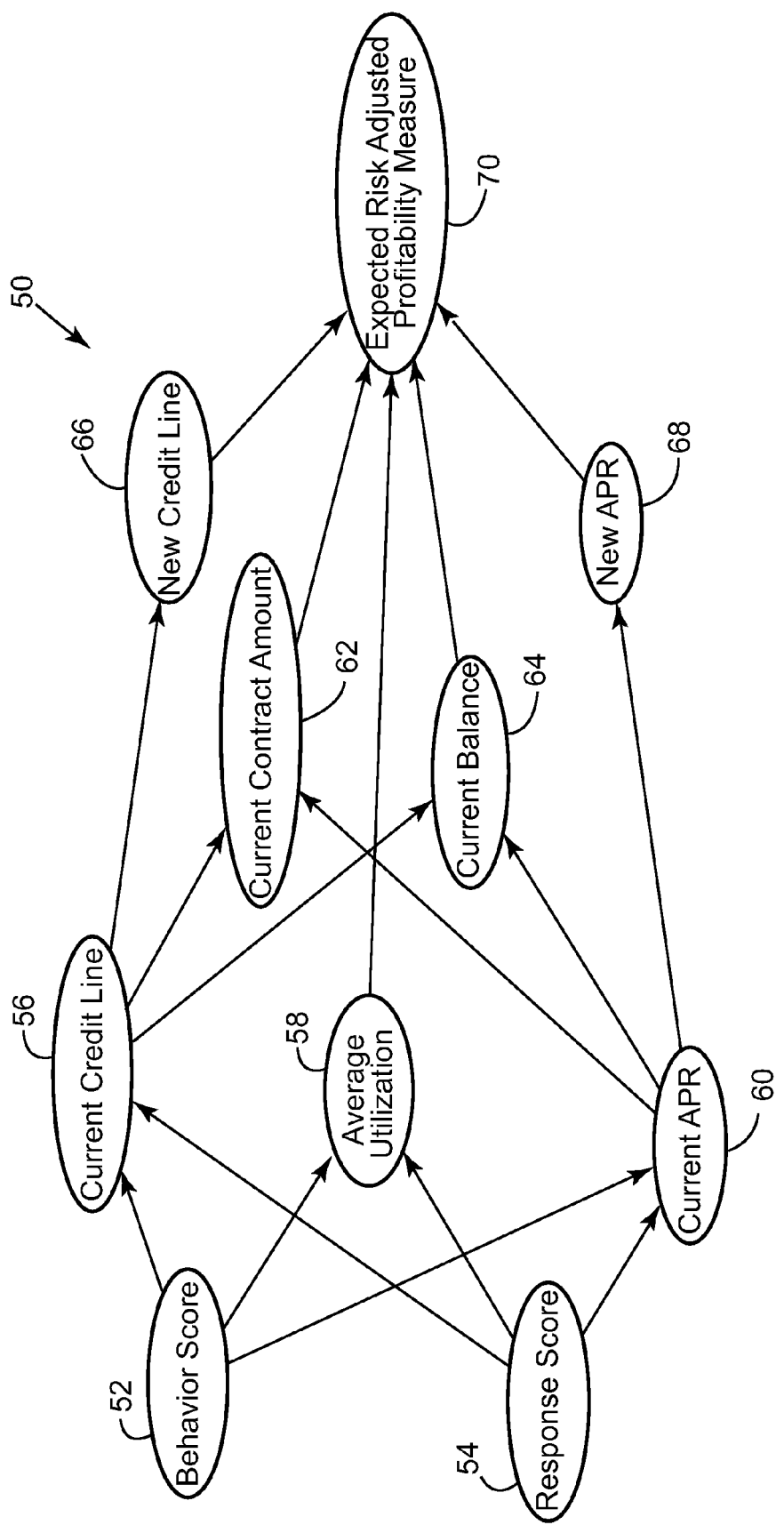
FIG. 2 is an exemplary illustration of the generation of a trained BBN, based on an exemplary BBN structure, in accordance with one embodiment of the present invention.

FIG. 2 is an exemplary illustration of the generation of a trained BBN, based on an exemplary BBN structure, in accordance with one embodiment of the present invention. The exemplary BBN structure 50 shown in FIG. 2 includes two input nodes, a behavioral score node 52 and a response score node 54. Based on the joint probability distribution associated with the behavioral score node 52 and the response score node 54, derived from their respective probability tables, the corresponding numerical score ranges for the nodes 52 and 54 are obtained. These scores along with the probability distribution associated with the current credit line node 56 may be used to derive the joint probability distribution of the initial credit line for a member. The average utilization 58 and current annual percentage rate (APR) 60 for a customer/member may also be derived similarly. As used herein, the current credit line 56 refers to a predetermined amount for which a prospective customer has been pre-approved. The average utilization 58 refers to the actual money used by the customer from his/her current credit line amount over a period of time. The current APR 60 refers to the annual percentage rate that the customer pays for the use of the financial product, such as, for example, a financial loan. The relationship is modeled as shown in FIG. 2 with appropriate arcs.

Also illustrated in FIG. 2 are one or more additional processing nodes, such as, for example, a current contract amount 62 and a current balance 64. As used herein, the current contract amount 62 refers to the amount for which the customer signs up (through a legally valid contract document) to use out of his/her initial credit line, and the current balance 64 refers to the amount that is actually used by a customer, from his/her current credit line 56. The current contract amount 62 for a customer is based on the numerical values of the current credit line 56 and the current APR 60 derived from their associated probability tables, along with the probability value associated with the current credit line node 56. The current balance 64 may also be similarly derived for a customer.

The new credit line 66 and the new APR 68 represent decision variables and are also processing nodes in the BBN 50. Decision variables have a special significance vis-à-vis other nodes in the network. Whereas other nodes are historical state nodes, decision nodes can be used to represent multiple scenarios or alternatives. As shown in FIG. 2, the new credit line 66 for a customer is based upon the current credit line 56 along with the probabilistic value associated with the new credit line node 66, and the new APR 68 for a customer is based on the current APR 60 along with the probabilistic value associated with the new APR 68. The output of the BBN 50, in one embodiment, is a business measure that is to be optimized. In one embodiment, the business measure is an expected risk adjusted profitability measure 70. The risk adjusted profitability measure refers to the contributed value (a measure of profit from the credit) that can be generated from the members of the target population keeping in mind the risk factor associated with the use of the financial product and at the same time meeting the expected level of profitability from each customer. The business measure may also include, for example, the balance growth, in another embodiment.

Referring to FIG. 1 again, a database 42 may further be used to store the trained BBN data. In one embodiment, the prediction component 40 is further configured to predict a business measure for each member of the target population based on the test/validation data 22 generated by the data processing component 16. As will be appreciated by those skilled in the art, the test/validation data may be used to determine the prediction accuracy of the trained BBN 26. In an exemplary implementation, the prediction component 40 instantiates the input variables of interest in the trained BBN 26 with the test/validation data 22, and the probability distribution of the output variable is inferred. This value is then compared with the actual value of the output variable and an error term is calculated. The overall prediction accuracy is determined from these individual errors. In one embodiment, and as discussed above, the prediction component 40 uses the trained BBN 26 to predict the risk adjusted profitability measure for each member of the population.

In accordance with another embodiment of the present invention, the prediction component 40 is configured to predict the risk adjusted profitability measure based on one or more selected combinations of marketing actions generated for each member of the target population. The marketing actions may represent business decisions related to key portfolio management processes of risk, marketing and/or pricing policies, such as, for example, decisions involving a credit line increase and/or a price decrease, in one embodiment. Referring to FIG. 1, in one embodiment, a marketing action generation component 28 is configured to generate the selected combinations of marketing actions for each member of the target population. In a particular embodiment, the marketing action generation component 28 simulates a list of possible or allowable marketing actions based on finite sets of possible stimuli, by determining one or more selected combinations of data values to be assigned to the behavioral data variables and the control data variables.

For example, and as mentioned above, the marketing actions may be a combination of two possible business stimuli such as for example a credit action 34 and a pricing action 36. The credit action may include for example, a credit line increase/decrease for an account and the pricing action may include an APR and/or decrease for an account. In a particular embodiment, the list of possible and/or allowable marketing actions may further be generated based upon a plurality of business rules 30. A database 32 may further be used to store the business rules 30. These rules may include, for example, constraints on the maximum credit line and the minimum APR that can be offered to members of the target population. For example, a marketing action on an APR for an account may include rules for calculating the offer APR as a combination of the behavioral score, the response score and the lenders exchange amount relative to the balance. Similarly, a marketing action on the credit line may be calculated as a function of the risk-profile of a member of the target population and the maximum credit amount for the account.

Referring to FIG. 1 again, the marketing actions 38 generated by the marketing action generation component 28 are further stored in database 42. The prediction component 40 is further configured to predict the total expected risk adjusted profitability measure, 44 for each of the marketing actions 38, for the members of the target population. Optimal marketing decisions may then be determined based upon the search space or action space of allowable marketing actions 38 generated by the marketing action generation component 28, in a manner as will be described in greater detail below.

The optimization component 46 is configured to determine an optimal marketing action based on one or more of the selected combinations of marketing actions 38 generated by the marketing action generation component 28 and the predicted business measure associated with each of the marketing actions, and further determines an optimal predicted business measure for the one or more members of the target population, based on the optimal marketing action. In one embodiment, the optimization component 46 is configured to determine the marketing action that maximizes the total expected risk adjusted profitability measure 44, for each member of the target population, subject to one or more business constraints 47. For example, the optimization component 46 may be configured to maximize the total expected risk adjusted profitability measure 44 subject to a constraint on the budget of the total credit line increase (CLI) that can be given to a member of the target population across one or more variables, such as, the amount of CLI and the amount of APR decrease. The variables may also include binary variables, which indicate whether a particular marketing action is chosen, or not. Further, the constraints may also include logical constraints, which may state, for example, that only one marketing action is possible for each account associated with a member of the target population. Further, and in one embodiment, the optimization component 48 may perform optimization using a mixed integer program, with constraints.

In another embodiment of the present invention, the system 10 further comprises a simulation component 48, wherein the simulation component 48 is configured to determine a prediction variability/uncertainty 49 associated with the optimal predicted business measure, for the members of the target population. The prediction uncertainty 49 represents the uncertainty of the predicted output variable associated with the optimal assignment for each member of the target population. In one embodiment, the prediction uncertainty 49 may be computed by instantiating each member account with the optimal assignment determined by the optimization component 48 and then computing the expected risk adjusted profitability measure as well as the risk adjusted profitability measure distribution of the optimal marketing action for each member account. In one embodiment, the simulation component may be implemented using Monte Carlo simulation to translate the prediction uncertainty throughout the overall system, based on the optimal decision.

Figure 3:
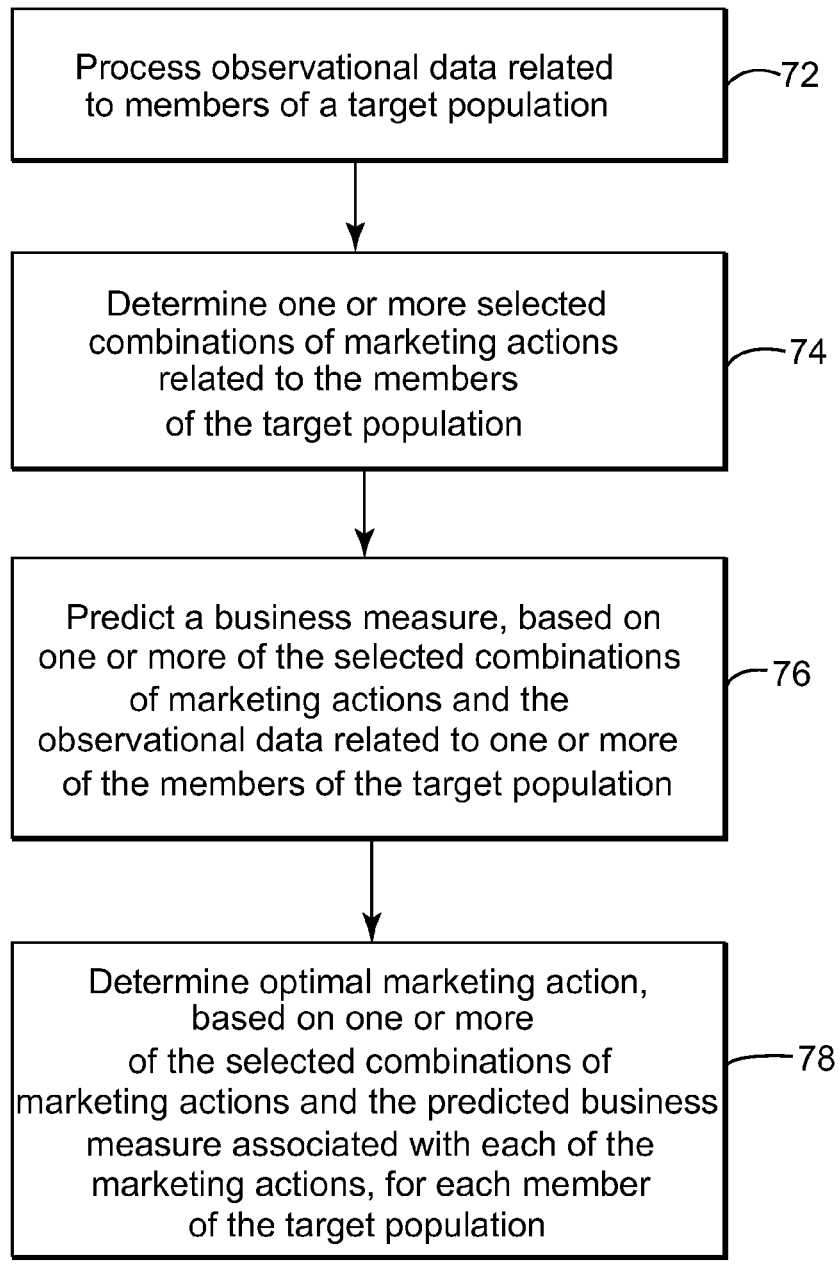
FIG. 3 is a flowchart of exemplary logic, including exemplary steps for developing an integrated business decision-making system.

FIG. 3 is a flowchart of exemplary logic including exemplary steps for developing an integrated business decision-making system. In step 72, observational data related to one or more members of a target population is processed. As mentioned above, the observational data may include one or more behavioral variables and one or more control variables that describe various behavioral aspects of an individual member account and future actions that may be controlled to influence an individual member account behavior. In step 74, one or more selected combinations of marketing actions related to the members of the target population are determined. In one embodiment, the marketing actions represent a business decision related to the business decision-making system. For example, and as discussed above, the marketing actions may include combinations of business stimuli, such as a credit line increase and/or an APR decrease for a member, in one embodiment and may be generated based upon a plurality of business rules. In step 76, a business measure is predicted, based on one or more of the selected combinations of marketing actions and the observational data related to one or more of the members of the target population. In one embodiment, the business measure is predicted using a prediction model. In a particular embodiment, and as discussed above, the prediction model is a BBN. In one embodiment, the business measure is a risk adjusted profitability measure, and a total expected risk adjusted profitability measure is predicted for one or more of the selected combinations of marketing actions, for each member of the target population. In step 78, an optimal marketing action is determined, based on one or more of the selected combinations of marketing actions, and the predicted business measure associated with each of the marketing actions, for each member of the target population.

An optimal predicted business measure for the members of the target population is further determined based on the optimal marketing action. In one embodiment, the optimal marketing action that maximizes the total expected risk adjusted profitability measure for each member of the target population is determined, subject to one or more business constraints, such as, for example, a total amount of credit for the target population, a fixed interest rate, a total size of the target population receiving credit and a total allowable risk level. In another embodiment, and as discussed above, the prediction variability associated with the optimal predicted business measure for the members of the target population is also determined.

The disclosed embodiments have several advantages including the ability to provide a structured decision making framework for a range of marketing actions for credit portfolios by integrating key portfolio management actions of risk, marketing and pricing into a single platform for improved decision making. The disclosed framework may be utilized to determine desired credit line increases, pricing policies and other promotions related to members of a target population, so as to maximize the profitability associated with a credit portfolio of accounts, and achieve an overall business goal. The disclosed framework may be used to provide a unified vision for business strategies that may be adopted by business processes, by combining several functional processes related to key portfolio management actions such as risk, marketing and pricing into a single platform. Further, the disclosed framework is flexible and may be adapted to various portfolios and functions, in a cost-effective manner. In addition, the disclosed integrated business decision framework may be used to make collective decisions on routine processes such as pricing of a financial product and determining the creditworthiness of the members of a target population.

As will be appreciated by those skilled in the art, the embodiments and applications illustrated and described above will typically include or be performed by appropriate executable code in a programmed computer. Such programming will comprise a listing of executable instructions for implementing logical functions. The listing can be embodied in any computer-readable medium for use by or in connection with a computer-based system that can retrieve, process and execute the instructions. Alternatively, some or all of the processing may be performed remotely by additional computing resources based upon raw or partially processed image data.

In the context of the present technique, the computer-readable medium is any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An integrated business decision-making system, comprising:
   a data processing component configured to process observational data related to one or more members of a target population;
   a prediction component configured to predict a business measure based on one or more selected combinations of marketing actions and the observational data related to one or more of the members of the target population;
   an optimization component configured to determine an optimal marketing action based on one or more of the selected combinations of marketing actions and the predicted business measure associated with each of the marketing actions, wherein the optimization component is configured to determine an optimal predicted business measure for the one or more members of the target population, based on the optimal marketing action; and a simulation component, wherein the simulation component is configured to determine a prediction variability associated with the optimal predicted business measure, for the one or more members of the target population, wherein the simulation component uses a Monte Carlo simulation that translates prediction uncertainty throughout the integrated business decision-making system based on the optimal predicted business measure and computes the respective prediction variability associated with each member of the target population by:

instantiating a respective member account of each member of the target population with the respective optimal predicted business measure; and computing an expected risk adjusted profitability measure for the optimal predicted business measure for each respective member account.

2. The system of claim 1, wherein the observational data comprises one or more behavioral variables and one or more control variables.

3. The system of claim 2, wherein the behavioral variables comprise at least one of a risk score, a utilization amount, an initial credit line, an initial balance, an initial contract amount, an initial annual percentage rate and a response score associated with the one or more members of the target population.

4. The system of claim 2, wherein the control variables comprise at least one of an action credit line and a promotional annual percentage rate associated with the one or more members of the target population.

5. The system of claim 1, further comprising a marketing action generation component, wherein the marketing action generation component is configured to generate one or more of the selected combinations of marketing actions for each member of the target population, and wherein the marketing actions represent at least one business decision related to the integrated business decision-making system.

6. The system of claim 5, wherein the marketing action generation component generates one or more of the selected combinations of marketing actions for each member of the target population based upon a selected combination of data values assigned to the observational data.

7. The system of claim 1, wherein the prediction component comprises a prediction model and wherein the prediction model is a Bayesian belief network.

8. The system of claim 1, wherein the business measure comprises at least one of a risk adjusted profitability measure and a balance growth.

9. The system of claim 1, wherein the prediction component is further configured to predict a total expected risk adjusted profitability measure for one or more of the selected combinations of marketing actions, for the members of the target population.

10. The system of claim 9, wherein the optimization component is further configured to determine the optimal marketing action that maximizes the total expected risk adjusted profitability measure, for each member of the target population, subject to one or more business constraints, wherein the business constraints comprise at least one of a total amount of credit for the target population, a fixed interest rate, a total size of the target population receiving credit and a total allowable risk level.

11. A method for developing an integrated business decision-making system, comprising:

processing observational data related to one or more members of a target population;

determining one or more selected combinations of marketing actions related to the members of the target population;

predicting a business measure based on one or more of the selected combinations of marketing actions and the observational data related to one or more of the members of the target population;

determining an optimal marketing action based on one or more of the selected combinations of marketing actions and the predicted business measure associated with each of the marketing actions, for each member of the target population;

determining a prediction variability associated with the optimal marketing action for each of the one or more members of the target population, wherein the prediction variability is determined using a Monte Carlo simulation that translates prediction uncertainty throughout the integrated business decision making system based on the optimal marketing action;

computing the respective prediction variability associated with each member of the target population by instantiating a respective member account of each member of the target population with the respective optimal predicted business measure; and computing both an expected risk adjusted profitability measure and a risk adjusted profitability measure distribution for the optimal predicted business measure for each respective member account.

12. The method of claim 11, further comprising determining an optimal predicted business measure for the one or more members of the target population, based on the optimal marketing action.

13. The method of claim 11, wherein the observational data comprises one or more behavioral variables and one or more control variables.

14. The method of claim 13, wherein the one or more selected combinations of marketing actions for each member of the target population is generated based upon a selected combination of data values assigned to at least one of the behavioral data variables and the control data variables.

15. The method of claim 11, wherein predicting the business measure comprises using a prediction model, and wherein the prediction model comprises a Bayesian belief network.

16. The method of claim 14, wherein the business measure comprises a risk adjusted profitability measure.

17. The method of claim 16, further comprising predicting a total expected risk adjusted profitability measure for one or more of the selected combinations of marketing actions, for the one or more members of the target population.

18. The method of claim 17, further comprising determining the optimal marketing action that maximizes the total expected risk adjusted profitability measure, for each member of the target population, subject to one or more business constraints, wherein the business constraints comprise at least one of a total amount of credit for the target population, a fixed interest rate, a total size of the target population receiving credit and a total allowable risk level.

19. An integrated business decision-making system, comprising:

a data processing component configured to process observational data related to one or more members of a target population;

a marketing action generation component configured to generate one or more selected combinations of marketing actions for each member of the target population, based upon the observational data;

a prediction component configured to predict a business measure based on the one or more selected combinations of marketing actions and the observational data related to one or more of the members of the target population;

an optimization component configured to determine an optimal marketing action based on one or more of the selected combinations of marketing actions and the predicted business measure associated with each of the marketing actions, wherein the optimization component is further configured to determine an optimal predicted business measure for the one or more members of the target population, based on the optimal marketing action; and a simulation component configured to determine a prediction variability associated with the optimal predicted business measure, for the members of the target population, wherein the simulation component uses a Monte Carlo simulation that translates prediction uncertainty throughout the integrated business decision-making system based on the optimal predicted business measure and computes the respective prediction variability associated with each member of the target population by:

instantiating a respective member account of each member of the target population with the respective optimal predicted business measure; and computing a risk adjusted profitability measure distribution for the optimal predicted business measure for each respective member account.

* * * * *